United States Patent Office 3,316,251
Patented Apr. 25, 1967

3,316,251
5,6-DIHYDRO-5-OXO-11H-PYRIDO-[2,3-b][1,5]-BENZODIAZEPINE DERIVATIVES AND PROCESS
Günther Schmidt, Biberach an der Riss, Germany, assignor to Boehringer Ingelheim G.m.b.H., Ingelheim am Rhine, Germany, a corporation of Germany
No Drawing. Filed Jan. 22, 1965, Ser. No. 427,503
Claims priority, application Germany, Jan. 28, 1964,
T 25,507
11 Claims. (Cl. 260—239.3)

The invention relates to the preparation of new 5,6-dihydro-5-oxo-11H-pyrido[2,3-b][1,5]benzodiazepine derivatives of the formula

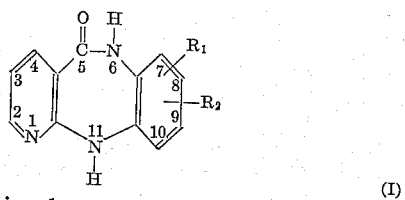

as well as of their salts with inorganic or organic acids. In the formula above $R_1$ and $R_2$, which may be identical or different, signify hydrogen or halogen atoms, lower alkyl-, alkoxy- or trifluoromethyl radicals or carboxyl- or carbalkoxy groups. The invention also relates to the process of preparing the compounds.

An object of the present invention is the obtention of a pyridobenzodiazepine derivative selected from the group consisting of compounds of the formula

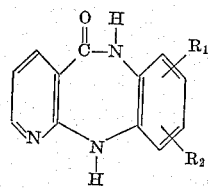

wherein $R_1$ and $R_2$ are selected from the group consisting of hydrogen, halogen, lower alkyl, lower alkoxy, trifluoromethyl, carboxyl and carbo-lower alkoxy, and their acid addition salts.

Another object of the present invention is the development of a process for the production of a pyridobenzodiazepine derivative selected from the group consisting of compounds of the formula

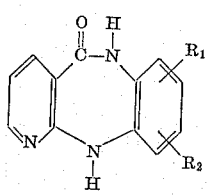

wherein $R_1$ and $R_2$ are selected from the group consisting of hydrogen, halogen, lower alkyl, lower alkoxy, trifluoromethyl, carboxyl and carbo-lower alkoxy, and their acid addition salts which comprises the steps of reacting a 2-halogen-nicotinic acid of the formula

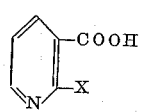

wherein X represents a halogen, with an o-phenylenediamine of the formula

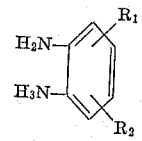

wherein $R_1$ and $R_2$ have the above-assigned meanings, at a temperature above 150° C., and recovering said pyridobenzodiazepine derivative.

These and other objects of the invention will become more apparent as the description thereof proceeds.

The compounds of the above Formula I are derivatives of a new ring system which has not previously been described in the literature. Their preparation results according to the invention by reaction of a 2-halogen-nicotinic acid of the formula

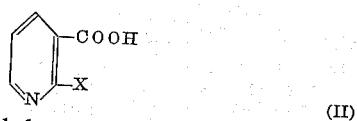

wherein X signifies a halogen atom, with an o-phenylenediamine of the formula

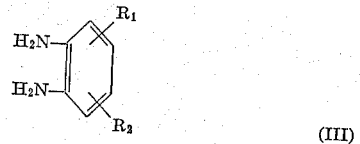

wherein $R_1$ and $R_2$ possess the meanings indicated above, at a temperature of above 150° C. The reaction occurs when utilizing approximately equimolar amounts of the Compounds II and III on heating to temperatures of above 150° C., if necessary, in an inert gas atmosphere. In absence of a solvent a spontaneous development of hydrogen halide occurs at the indicated temperature together with a simultaneous dehydration. The reaction, however, may also be conducted in the presence of an inert, high-boiling, organic solvent such as tetrahydronaphthalene, dichloro- or trichlorobenzene, ethylene glycol and others. In the presence of a solvent the evolution of hydrogen halide starts slower and proceeds more uniformly. Since some of the above-listed solvents, such as trichlorobenzene do not dissolve the final product of Formula I, recovery of the product from such solvents may be accomplished by decanting the solvent at temperatures slightly above its solidification point. Others of the solvents are also solvents for the final product and are removed by distillation under vacuum. After removal of the solvent, if any, the residue is treated by trituration and leaching with a diluted alkali metal hydroxide solution and with water. The desired product in free base form is isolated in the usual manner, for example by vacuum filtration, and purified by recrystallization.

It is definitely surprising that the reaction of the 2-halogen-nicotinic acid with an o-phenylenediamine occurs with the forming of the new ring system mentioned above. It is known from the literature (Chem. Zentralblatt 1932, I, 1100) that in the reaction of nicotinic acid with o-phenylenediamine, 2-(pyridyl-3)-benzimidazole is obtained.

In the case where o-phenylenediamines of the Formula III for the reaction according to the invention are used, wherein one of $R_1$ or $R_2$ possesses meaning other than hydrogen or when they represent different substituents, either mixtures of the two possible isomers or the individual isomers are formed, however as yet it has not been clarified which formula applies to the individual isomers. When the compound of the Formula III contains in the 3 and 6 positions or in the 4 and 5 positions two identical substituents, the possibility of a formation of isomers is naturally out of question.

If so desired the new compounds in the free base form may be converted into their acid addition salts with inorganic or organic acids. The new compounds are useful as intermediate products for the preparation of medicaments. For example they undergo N-alkylation in 6-position by reacting their 6-alkalimetal analogues with alkyl halides, thus obtaining 5,6-dihydro-5-oxo-6-alkyl-11H - pyrido[2,3-b][1,5]benzodiazepines. These compounds have useful pharmacodynamic properties, especially they exhibit sedative, antipyretic and antitussive activities.

The following examples will serve as more detailed explanation of the invention. They are not to be construed however as limiting the invention.

*Example I.—5,6-dihydro-5-oxo-11H-pyrido[2,3-b][1,5] benzodiazepine (I, $R_1=R_2=H$)*

(a) 15.7 gm. (0.1 mol) of 2-chloronicotinic acid and 10.8 gm. (0.1 mol) of o-phenylenediamine were heated to 150° C. in an open vessel, while stirring. At this temperature the evolution of HCl began. This evolution of HCl was finished after about two minutes. The melt solidified gradually and was pulverized after being cooled. After a thorough leaching first with diluted sodium hydroxide and then with hot water, the residue was crystallized from dioxane. Yellow crystals of 5,6-dihydro-5-oxo-11H-pyrido[2,3-b][1,5]benzodiazepine (I, $R_1=R_2=H$)

with a melting point of 294–295° C. were thus obtained. The yield amounted to 50% of the theory.

*Analysis.*—$C_{12}H_9N_3O$; molecular weight=211.2. Calculated: C, 68.24%; H, 4.29%; N, 19.89%. Found: C, 68.30%; H, 4.34%; N, 20.15%.

(b) The same compound was obtained when 0.1 mol each of 2-chloronicotinic acid and o-phenylenediamine were dissolved in 100 ml. of warm trichlorobenzene and this solution was heated while stirring, to about 170° C. for ½ hour. After cooling, the trichlorobenzene was poured off, and the residue was triturated with diluted sodium hydroxide. After being leached with water, the residue was, as in (a) above, crystallized from dioxane. The yield was about 75% of the theory of 5,6-dihydro-5-oxo-11H-pyrido[2,3-b][1,5]benzodiazepine (I, $R_1=R_2=H$)

*Example II.—5,6-dihydro-5-oxo-8 (or 9)-chloro-11H-pyrido[2,3-b][1,5]benzodiazepine (I, $R_1=Cl$, $R_2=H$)*

0.1 mol each of 2-chloronicotinic acid and 1,2-diamino-4-chlorobenzene were reacted and worked up as in Example I. The product obtained, either a mixture of isomers in the 8 and 9 positions or one or the other of the possible isomers of 5,6-dihydro-5-oxo-8(or 9)-chloro-11H-pyrido[2,3-b][1,5]benzodiazepine (I, $R_1=Cl$, $R_2=H$) had a melting point of more than 300° C. (after crystallization from dioxane). The yield was 51% of the theory.

*Analysis.*—$C_{12}H_8ClN_3O$; molecular weight=245.7. Calculated: C, 58.66%; H, 3.28%; N, 17.11%; Cl, 14.43%. Found: C, 58.45%; H, 3.45%; N, 16.90%; Cl, 14.46%.

*Example III.—5,6 - dihydro-5-oxo-8(or 9) -methyl-11H-pyrido[2,3-b][1,5]benzodiazepine (I, $R_1=CH_3$, $R_2=H$)*

0.1 mol each of 2-chloronicotinic acid and 3,4-diaminotoluene were reacted and worked up as in Example I. The product obtained, either a mixture of isomers in the 8 and 9 positions or one or the other of the possible isomers of 5,6-dihydro-5-oxo-8(or 9)-methyl-11H-pyrido[2, 3-b][1,5]benzodiazepine (I, $R_1=CH_3$, $R_2=H$) had a melting point of more than 240° C. (after crystallization from dioxane). The yield was 57% of the theory.

*Analysis.*—$C_{13}H_{11}N_3O$; molecular weight=225.2. Calculated: C, 69.28%; H, 4.92%; N, 18.65%. Found: C, 69.30%; H, 4.99%; N, 18.50%.

*Example IV.—5,6-dihydro-5-oxo-8,9-dimethyl-11H-pyrido [2,3-b][1,5]benzodiazepine (I, $R_1=R_2=CH_3$ in the 8 and 9 positions)*

0.1 mol each of 2-chloronicotinic acid and 1,2-diamino-4,5-dimethyl-benzene were reacted and worked up as described in Example I. The product obtained, 5,6-dihydro-5-oxo-8,9-dimethyl-11H - pyrido[2,3-b][1,5]benzodiazepine (I, $R_1=R_2=CH_3$ in the 8 and 9 positions) had a melting point of 295° C. (after crystallization from dioxane). The yield was 60% of the theory.

*Analysis.*—$C_{14}H_{13}N_3O$; molecular weight=239.3. Calculated: C, 70.28%; H, 5.47%; N, 17.56%. Found: C, 70.20%; H, 5.59%; N, 17.33%.

The preceding specific embodiments are illustrative of the practice of the invention. It is to be understood that other expedients known to those skilled in the art may be employed without departing from the spirit of the invention or the scope of the appended claims.

I claim:
1. A pyridobenzodiazepine derivative selected from the group consisting of compounds of the formula

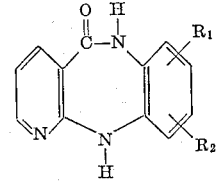

wherein $R_1$ and $R_2$ are selected from the group consisting of hydrogen, halogen, lower alkyl, lower alkoxy and trifluoromethyl, and their acid addition salts.

2. 5,6 - dihydro - 5 - oxo - 11H - pyrido[2,3-b][1,5] benzodiazepine of the formula

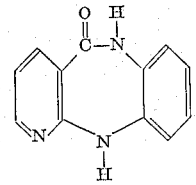

3. 5,6 - dihydro - 5 - oxo,8,9 - dimethyl-11H-pyrido-[2,3-b][1,5]benzodiazepine of the formula

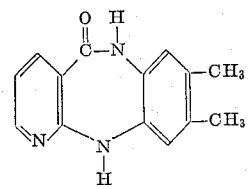

4. A process for the production of a pyridobenzodiazepine derivative selected from the group consisting of compounds of the formula

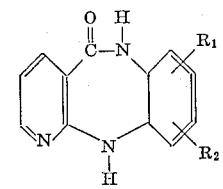

wherein $R_1$ and $R_2$ are selected from the group consisting of hydrogen, halogen, lower alkyl, lower alkoxy and trifluoromethyl, and their acid addition salts which comprises the steps of reacting a 2-halogen-nicotinic acid of the formula

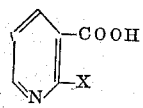

wherein X represents a halogen, with an o-phenylenediamine of the formula

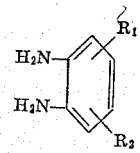

wherein $R_1$ and $R_2$ have the above-assigned meanings, at a temperature above 150° C., and recovering said pyridobenzodiazepine derivative.

5. The process of claim 4 wherein said reaction is conducted at temperatures above 150° C. and below the decomposition temperature of the desired product.

6. The process of claim 4 wherein said reaction is conducted in an inert atmosphere.

7. The process of claim 4 wherein said reaction is conducted in the presence of an inert high-boiling organic solvent at temperatures above 150° C. and below the boiling point of said solvent.

8. The process of claim 4 wherein said o-phenylenediamine is o-phenylenediamine.

9. The process of claim 4 wherein said o-phenylenediamine is 1,2-diamino-4-chlorobenzene.

10. The process of claim 4 wherein said o-phenylenediamine is 3,4-diaminotoluene.

11. The process of claim 4 wherein said o-phenylenediamine is 1,2-diamino-3,4-dimethylbenzene.

No references cited.

ALEX MAZEL, *Primary Examiner.*

A. D. ROLLINS, *Assistant Examiner.*